United States Patent

Smith et al.

[15] 3,707,193
[45] Dec. 26, 1972

[54] GAS-STRENGTHENED STEAM FOAM WELL CLEANING

[72] Inventors: Terry K. Smith, Los Angeles, Calif.; Ying-Chech Chiu; Jimmie B. Lawson, both of Houston, Tex.

[73] Assignee: Shell Oil Company, Huston, Tex.

[22] Filed: Oct. 1, 1971

[21] Appl. No.: 185,815

[52] U.S. Cl. .................. 166/303, 134/22 C, 166/309
[51] Int. Cl. ........................ E21b 43/20, E21b 43/24
[58] Field of Search .....134/22 R, 22 C, 36; 166/288, 166/303, 304, 309, 312; 252/8.55 B, 307; 175/64, 71

[56] References Cited

UNITED STATES PATENTS

| 3,410,344 | 11/1968 | Cornelius | 166/303 |
| 3,412,793 | 11/1968 | Needham | 166/270 |
| 3,530,939 | 9/1970 | Turner et al. | 166/312 |
| 3,549,420 | 12/1970 | Cunningham | 134/22 R |
| 3,565,177 | 2/1971 | Hutchison | 166/312 |
| 3,637,021 | 1/1972 | Hutchison et al. | 134/22 C |

*Primary Examiner*—Marvin A. Champion
*Assistant Examiner*—Jack E. Ebel
*Attorney*—Harold L. Denkler et al.

[57] ABSTRACT

In cleaning a contaminant-containing conduit, steam is circulated to heat the contaminating materials and a gas-strengthened steam foam is circulated into and out of the contaminant-containing portion of the conduit to entrain and remove heated contaminants.

10 Claims, No Drawings

3,707,193

GAS-STRENGTHENED STEAM FOAM WELL CLEANING

BACKGROUND OF THE INVENTION

This invention relates to cleaning conduits, such as boreholes, tubing strings, flow lines etc., in and around oil wells. It is particularly applicable to conduit-cleaning operations in field locations from which viscous oils are produced by means of a steam-heated oil recovery process.

Conduit-cleaning operations are often employed in a well to remove various types of solid and/or liquid contaminants such as "fill" or "debris" involving sand grains and/or intergrannular cementing materials or the like solids from the reservoir formation, rust and scale or corrosion products from equipment within the wells, viscous and/or solidified organic or inorganic materials, or the like. In such well cleaning operations, fluids are usually circulated into and out of the contaminant-containing portions of the wells (usually by a flow down through a pipe string and up through the annular space between that string and the next larger pipe string or the borehole wall) to entrain and remove the contaminants. U.S. Pat. No. 3,463,231 describes a well-cleaning procedure in which the circulated fluid is a gas-in-liquid foam that contains specified foam stability-imparting types and proportions of aqueous liquids, surfactants and gas. Such a gas-in-liquid foam is generally effective in entraining and lifting discrete particulate solid contaminants and displacing mobile liquid contaminants but is relatively ineffective with respect to detaching and/or mobilizing viscous liquids or relatively low melting solids such as viscous oils, tars, asphaltenes, waxes, etc., that stick to the walls of the well conduits such as screens, liners, perforated casings, etc. Alternatively, using steam as a well-cleaning fluid is effective in releasing and/or mobilizing meltable solids or viscous liquids but is relatively ineffective in lifting and removing solid contaminants.

The present invention is, at least in part, based on a discovery that when the interior of a contaminant-containing conduit is steam heated and a gas-strengthened steam foam is formed from a mixture of steam and a relatively non-condensible gas in proportions that maintain a selected high temperature while increasing the strength of the foam, the gas-strengthened steam foam can be circulated through the conduit to entrain and remove steam-heated contaminants while keeping them hot and preventing their resolidification and sticking together or sticking to the walls of the conduits or other relatively immobile materials. Field tests using a gas-strengthened steam foam to clean a well through which a viscous oil was produced have demonstrated an efficient entrainment and removal of contaminants in the foam of desegregated solids and thermally mobilized liquids. In those tests during a shut down of the steam foam circulating the static, weight-supporting strength of the gas-strengthened steam foam proved to be such that the entrained solids remained suspended in and on a column of foam and were immediately discharged when additional foam was pumped into the well. In cleaning similar wells with conventional gas-in-liquid foams, the contaminants that were removed were removed in the form of relatively large aggregates of solidified organic and inorganic materials.

SUMMARY OF THE INVENTION

This invention relates to cleaning conduit. The conduit and the contaminants it contains are heated by contacting them with steam. The steam heated contaminants are entrained and removed by circulating a preformed gas-strengthened steam foam into and out of the contaminant-containing portion of the conduit. The gas-strengthened steam foam is a steam foam that contains a relatively small but effective proportion of gas that is non-condensible at the temperature and pressure of the conduit-cleaning operation. The proportion of gas is sufficient to increase the steam foam strength (e.g., as represented by the density, viscosity or static weight-supporting capacity of the foam) while maintaining a selected relatively high temperature. The gas-strengthened steam foam has a foam strength that is high relative to that of a gas-free steam foam of otherwise similar composition, temperature and pressure.

In conducting the present invention, the steam used to heat the contaminants within the well and/or to form a gas-strengthened steam foam can comprise substantially any dry, wet, superheated or low-grade steam in which the condensate and/or liquid components are compatible with and do not inhibit the foam producing properties of a foam-forming surfactant. Particularly in field locations in which steam-heated thermal oil recovery processes (such as steam drives, steam soaks, etc.) are conducted, the steam can advantageously be formed by the relatively high capacity steam generator utilized for the oil recovery operations.

In a steam generating device, the generation of steam is accompanied by a fluid volume expansion of about 1,000 times during the conversion of aqueous liquid to vapor. At least some of the energy involved in such a steam generation fluid expansion can be used directly as the driving force for displacing fluid through a conduit by connecting the steam generating device to the conduit in a manner such that fluid displaced from the steam generating device is conveyed into the conduit. Alternatively the thermal energy imparted to the steam during its generation can be used indirectly as the driving force for displacing fluid through a conduit by expanding the steam within pistons, turbines or the like to drive a pumping device arranged to displace fluid into the conduit.

In a preferred embodiment of the present invention, a steam foam is displaced through a hot conduit by flowing fluid from a steam generating device into contact with a foam forming surfactant to form a steam foam, flowing the steam foam into the hot conduit and displacing steam foam into the conduit in response to energy imparted to the steam during its generation. And, in particular a preferred embodiment, the steam foam is driven into the conduit by interconnecting the steam generating device and the conduit so that the fluid displaced from within the steam generating device is displaced into the conduit. Such a direct or indirect use of the steam generation energy can also be used to displace steam into the conduit to heat materials within a conduit. Such a use of steam generating energy to displace steam and/or steam foam into a conduit to be cleaned is particularly valuable in utilizing relatively compact steam generating equipment in place of relatively bulky and expensive gas-compressing equipment in order to drive the steam foam through the conduit. In locations in which steam-heated thermal recovery processes are operated, suitable steam generating equipment may be available where the cleaning is to be conducted. In such cleaning operations the steam foam is preferably a gas-strengthened steam foam in which a relatively small proportion of gas is added by means of a relatively small compressor and/or tanks of pressurized gas or by means of air and/or gas generating components mixed with the foam forming surfactant materials.

In conducting the present process in a situation in which a relatively high temperature is desired (for example, in order to melt a relatively high melting solid), the preheating steam and gas-strengthened steam foam are preferably introduced at rates or against back pressures sufficient to maintain the pressures on the steam and the foam at substantially the steam pressure corresponding to the temperature selected for the cleaning operation.

The gas used to form gas-strengthened steam foam can comprise substantially any gas which is substantially non-condensible at the temperature and pressure of the cleaning operation and is compatible with the foam forming surfactant and other components of the steam foam. Such gas can comprise air, nitrogen, carbon dioxide, methane, flue gas, ammonia, lower amines, etc. In most situations, air is preferred.

In general, in a steam foam, the temperature of the foam is substantially equal to the boiling point of the liquid-phase components of the foam at the pressure of the vapor of those components. Where, for example, the liquid-phase components of a steam foam contain a material, such as alcohol, which forms a low-boiling azeotrope with water, the foam temperature is substantially the boiling temperature of the azeotrope, rather than the boiling temperature of water. Similarly, where the steam in a steam foam is mixed with noncondensible gas, the effective pressure relative to the vaporization of the liquid components of the foam is the partial pressure of the steam in the mixture. In such a situation, where the proportion of non-condensible gas is significant, the temperature of the foam is significantly lower than that of an otherwise similar gas-free steam foam. In certain situations it is desirable to lower the temperature of a steam foam at a given pressure. For example, it may be desirable to clean a conduit at a relatively high pressure but relatively low temperature in order to melt and entrain a heat-sensitive contaminant without exceeding its decomposition temperature. Or, as described in U.S. Pat. No. 3,412,793, in a steam-foam-plugging of a reservoir thief zone, it may be desirable to increase the life span of a portion of a steam foam that remains substantially stationary within relatively cool surroundings in which the foam temperature is reduced by the heat lost to the surroundings. The life span of a so-positioned and cooled steam foam is longer if the condensation temperature of the steam foam is lower. Such an adjustment of the steam foam condensation temperature can be effected by azeotropically lowering the boiling point of the liquid phase of the foam and/or by lowering the partial pressure of the steam in the gas phase by adding a significant proportion of non-condensible gas.

In respect to conduit cleaning operations, particularly those in wells or similar situations where a significant foam strength is needed to entrain and carry solid contaminants, applicants discovered that a relatively small proportion of non-condensible gas provides a relatively large increase in the foam strength without significantly lowering the condensation temperature of the steam foam. The strength of the foam is readily characterized by a relatively high density, high viscosity and/or high weight-supporting capacity when stationary at a temperature at which the foam is stable. Applicant's discovered that in a steam foam the presence of from about 0.2 to 15 parts by volume of non-condensible gas per 100 parts of steam cause a significant improvement in the strength of a steam foam. In addition in such proportions, the non-condensible gas causes only a relatively insignificant lowering in the temperature of the steam foam. In a preferred embodiment of the present process, the proportion of non-condensible gas to be used can be determined by comparing the strengths of steam foams containing various proportions of the gas and selecting a proportion which provides a foam strength exceeding that of a gas free steam foam having substantially the same temperature at the same pressure.

In forming a gas-strengthened steam foam in accordance with the present process, the noncondensible gas can be mixed into the steam foam in numerous ways. For example, air can be compressed and pumped into a steam generator (or conduits upstream of the generator). The pressure on the liquid in a bottled gas container of nitrogen, carbon dioxide, or the like can be released to the extent that displaces such a gas into the steam generator. Gas generating chemicals such as water soluble bicarbonates and/or ammonium salts, or the like, can be dissolved or entrained in an aqueous liquid which contains or is mixed with the surfactant-containing liquid and is flowed into the steam generating means.

The liquid used to form the gas-strengthened steam foam can be substantially any liquid that contains a significant proportion of water and is miscible with water and is compatible with a foam forming surfactant. Examples of such liquids include water, aqueous solutions containing water soluble salts such as alkali metal or ammonium salts, aqueous solutions containing water miscible solvents such as alcohols, glycols, ketones, alkehydes, and the like.

The surfactants used to form the gas-strengthened steam foam can comprise substantially any foam-forming surfactant that can be dissolved or dispersed in an aqueous liquid system. In general anionic, nonionic or cationic surfactants can be used, but the anionic surfactants, such as sodium dodecyl benzene sulfonates, are preferred. Particularly suitable surfactants comprise mixtures of alkali metal salts of petroleum sulfonates and sulfated polyoxyalkylated alcohol surfactants, such as the mixtures described in the J. Reisberg, G. Smith and J. B. Lawson U.S. Pat. No. 3,508,612. Suitable sulfonate surfactants are commercially available as Petroleum Sulfonates from Bray Chemical Company, Bryton Sulfonates from Bryton Chemical Company, Petronates and Pyronates from Sonneborn Division of Witco Chemical Company, Promor Sulfonates from Mobil Oil Company and the like. Surfactant sulfates of ethoxylated alcohols are available as Neodols from Shell Chemical Company, Tergitols from Union Carbide and the like. Suitable soap type surfactants include sodium oleates, the soaps of tall oil heads etc., such as those commercially available as Acintol Heads from Arizona Chemical Company, etc. Cationic surfactants such as quaternary ammonium salts (e.g., Redicots E-11 from Armour Chemical Company) and the like surfactants can also be used.

In a preferred operating procedure, the present invention can be practiced with equipment which is generally available in a field location, particularly in a location in which a steam heated thermal oil recovery is in operation. A well cleaning work string, or fluid inflow pipe string, can be run in and manipulated by equipment such as a "gin-pole" or simple production hoist. The work string can comprise a spooled continuous string of pipe which can be advanced or withdrawn by a pipe snubber. Any necessary drilling can be accomplished by means of a workover rig. In general, a pipe string is run into the well to be cleaned to a depth that is near the contaminants or fill within the well. The steam and the gas-strengthened steam foam are circulated down that pipe and up the annulus and the pipe is lowered as required to keep it near the top of the layer of contaminants being removed.

In a preferred operation, a steam generator that is adapted to produce a wet steam such as about an 80 percent quality or low-grade steam, is connected to flow steam into a foam generating means. The foam generating means can comprise a screen or porous frit or an eductor upstream of flow baffles, or the like. An air compressor or other source of compressed gas is connected to flow gas into the foam generating means. A pumping means is arranged to flow a chemical solution containing an aqueous dispersion of surfactant into the foam generating means. Steam is circulated into and out of the well against a back pressure sufficient to maintain a steam pressure corresponding to the temperature selected for the well cleaning operation within the well. When steam is returning at substantially steam temperature, the fluid being inflowed into the well is converted to the gas-strengthened steam foam that is produced by the foam generator. The flow rates of the steam, gas and chemical solution entering the foam generating means are coordinated with respect to the temperature and pressure of the well cleaning operation. For example, for operations at pressures of from about 100 – 1,000 psi, suitable ranges of proportions for the components of the gas-strengthened steam foam comprise from about 0.2 – 15 standard cubic feet of gas per 100 standard cubic feet of steam and from about 0.5 – 100 standard cubic feet of steam per gallon of liquid chemical solution with the chemical solution containing from about 0.5 to 5 percent by weight of foam-forming surfactant.

FIELD TESTS

This invention was tested by circulating a gas-strengthened steam foam as the drilling and cleaning fluid used in drilling out about 250 feet of fill of a varied but undetermined composition in a well approximately 1,000 feet deep. The drilling was accomplished with a workover rig using the steam foam as a drilling fluid, circulating down the drill pipe and up the annulus between the drill string and an 8 inch casing. An air compressor was set to deliver about 30 standard cubic feet per minute of air at a pressure of about 200 pounds per square inch and was connected to a foam generating device comprising a small baffle filled chamber. Containers and pumping means were ranged for delivery of aqueous surfactant solution to the foam generator and a field located steam generator capable of converting about 1,000 barrels per day of feed water to 75 percent quality steam was connected so that selected proportions of its output could be supplied to the foam generator.

In an initial test, a 100 foot run of dirty, rusty, oily, 2-inch diameter pipe was laid on the surface and connected to the downstream end of the foam generator. The steam generator was adjusted to apply about 25 percent of its output and an aqueous solution of 30 pounds of Siponate DS–10 and 15 pounds of Neodol 25–3S surfactants in 200 gallons of fresh water was injected into the foam generagor at about 1 gallon per minute. No foam appeared at the outflow end of the pipe. The steam flow was gradually decreased and the surfactant inflow rate increased until, at an air flow rate of about 30 cubic feet per minute and a steam flow rate corresponding to about 200 barrels per day feed water conversion and a surfactant solution inflow rate of about 10 gallons per minute, a good foam issued from the end of the pipe. The contaminants within the pipe (viscous oil, asphaltenes, sand, etc.) were relatively quickly discharged and the foam displaced through the pipe outflowed as a white apparently uncontaminated, relatively dense foam that had the appearance of shaving lather but which relatively quickly broke to an aqueous liquid as it cooled to the ambient surface temperature. The foam effectively cleaned the contaminants from the pipe. Further dilutions of the surfactant solution were found to be possible without a significant reduction in foam strength.

In the drilling test, three 800 gallon mixing tanks were filled with a 1.5 percent by weight solution of a 2 to 1 mixture of Siponate DS–10 and Neodol 25–3S surfactants. The liquid pump was set to deliver about 8 gallons per minute of this solution to the foam generator. The workover rig drill string was lowered to within about 5 feet from the top of the fill at a depth of about 860 feet. In order to heat the well, steam was introduced at a rate of about 150 barrels of water per day until substantially all of the materials within the conduit to be cleaned (the 8-inch well casing were heated to steam temperature as evidenced by the steam outflow from the 4-inch "blooey" line connected to the wellhead.

While continuing the same rate of steam injection, the injection of the surfactant and air were started with the air being injected at about 30 standard cubic feet per minute. After about 30 minutes of substantially no outflow a stream of liquid appeared, became a stream of thin slurry then a dark brown slurry which appeared to be relatively viscous and to contain bubbles. Drilling was then initiated and the outflowing fluid during the first 120 feet of drilling varied from water, oil, fine sand, drilling mud and the like. During about the first 120 feet of drilling the outflowing fluid became a viscous white foam. This foam resembled shaving lather loaded with droplets of crude oil and particles of gravel of up to 2 to 3 millimeters in diameter, probably from the gravel packing in the well. The outflowing gravel was completely desegregated into individual grains which were to some extent coated with asphaltenes or tars. The drilling out of the 250 feet of fill required a total of about 5 hours and removed about 80 cubic feet of debris consisting of sand, gravel, asphaltenes, viscous oil, etc.

During the time-periods (e.g., 30 minutes) in which the pipe connections were broken to add additional sections of drill pipe, it was observed that the foam in the hot drill pipe and annulus had a holding capacity and a static strength sufficient to retain the suspended solids. Each time steam foam circulation was resumed, entrained solids were discharged substantially immediately indicating that they had been supported in the column of foam standing in the annulus.

The so-cleaned well has been returned to production and is performing well. A production increase of from about 10 barrels per day to about 30 barrels per day resulted from the cleaning operation. The materials removed during the steam foam cleaning were significantly more completely desegregated than those ordinarily removed during conventional gas foam cleaning operations in similar wells.

What is claimed is:

1. A conduit cleaning process comprising:
   flowing steam into a contaminant-containing portion of a conduit to contact and heat the contaminants; and
   circulating a pre-formed, gas-strengthened, steam and gas in liquid foam into and out of the contaminant-containing portion of the conduit to entrain and remove steam-heated contaminants.

2. The process of claim 1 in which the ratio of gas to steam in the gas-strengthened steam foam is one that enhances the strength of the foam relative to the strength of a gas-free steam foam of otherwise similar composition at substantially the same temperature and pressure.

3. The process of claim 2 in which said conduit is located in a well and the steam and gas-strengthened steam foam are circulated from a surface location to the contaminant-containing portion of the conduit and back to a surface location against a back pressure corresponding to the pressure of steam at a temperature selected for a well cleaning operation.

4. The process of claim 3 in which a relatively non-condensible gas, steam and an aqueous liquid solution of foaming surfactant are flowed through a surface-located foam generating means to form said gas-strengthened steam foam.

5. The process of claim 4 in which said gas-strengthened steam foam contains from about 0.2 – 15 volumes of relatively non-condensible gas per 100 volumes of steam.

6. In a process for circulating foam through a relatively hot conduit, the improvement comprising:
   flowing steam from a steam generating device into contact with foam-forming surfactant to form a steam foam;
   flowing the steam foam into the conduit; and
   utilizing energy imparted to the steam during its generation to drive steam foam into the conduit.

7. The process of claim 6 in which noncondensible gas is mixed with said steam and surfactant to form a gas-strengthened steam foam having a strength exceeding that of a gas-free steam foam of otherwise similar composition at substantially the same temperature and pressure.

8. In a steam driven process for circulating hot fluid through a conduit the improvement which comprises:
   flowing steam from a steam generating device into a conduit to heat the material in the conduit to substantially a steam temperature;
   subsequently flowing said steam into contact with foam-forming surfactant to form a steam foam;
   flowing the steam foam into the conduit; and
   utilizing energy imparted to the steam during its generation to displace steam foam into the conduit.

9. The process of claim 8 in which non-condensible gas is mixed with said steam and surfactant to form a gas-strengthened steam foam having a strength exceeding that of a gas-free steam foam of otherwise similar composition at substantially the same temperature and pressure.

10. The process of claim 9 in which the steam foam is displaced into the conduit by interconnecting the steam generating device and the conduit so that fluid displaced from within the steam generating device is displaced into the conduit.

* * * * *